(No Model.) 2 Sheets—Sheet 1.
A. G. CHRISTMAN.
COMBINED CULTIVATOR AND HOE.
No. 306,219. Patented Oct. 7, 1884.
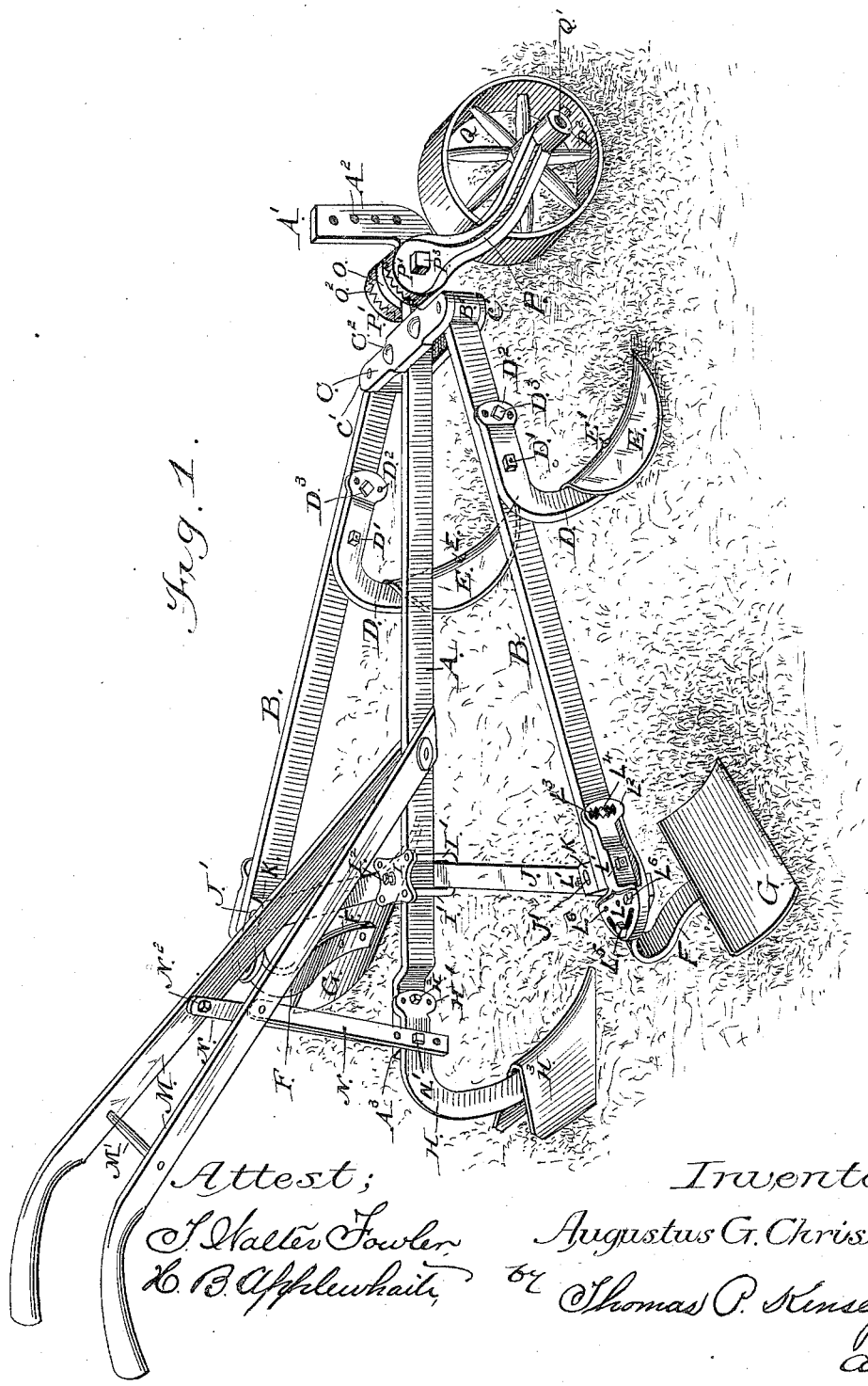
Attest:
J. Walter Fowler
H. B. Applewhaite
Inventor:
Augustus G. Christman,
by Thomas P. Kinsey
Atty.

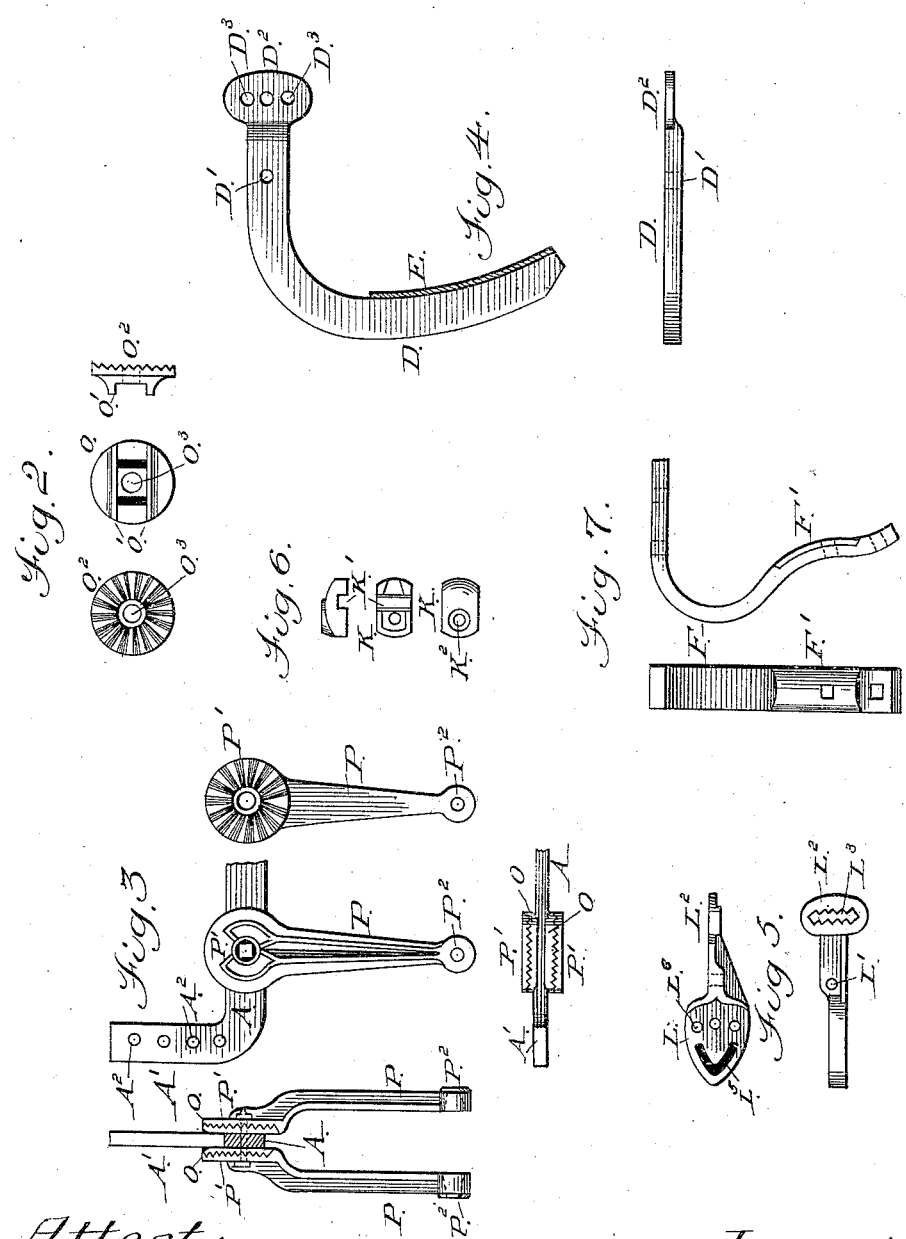

UNITED STATES PATENT OFFICE.

AUGUSTUS G. CHRISTMAN, OF LITIZ, PENNSYLVANIA.

COMBINED CULTIVATOR AND HOE.

SPECIFICATION forming part of Letters Patent No. 306,219, dated October 7, 1884.

Application filed December 3, 1883. (No model.)

*To all whom it may concern:*

Be it known that I, AUGUSTUS G. CHRISTMAN, a citizen of the United States, residing at Litiz, in the county of Lancaster, State of Pennsylvania, have invented a new and useful Improvement in Combined Cultivators and Hoes, of which the following is a specification.

This improvement relates more particularly to the class of one-horse cultivators and hoes intended for the culture of tobacco, corn, and cereal crops.

The object of the invention is to furnish a simple, substantial, cheap, and effective cultivator for the use of the agricultuist, that may be adapted to the many requirements of seed or truck farming, adjustable as to depth and width of furrows, and which (as adjusted) will throw the upturned soil to the right or left or toward the center of the cultivator in use. These objects are attained in the use of the improvements shown in the drawings herewith, forming part of this specification, and in which similar letters indicate similar parts throughout.

Figure 1, Sheet 1, is a perspective view of the combined cultivator and hoe complete. Fig. 2, Sheet 2, is a portion of the center bar, showing the ratchet-faced pads or washers. Fig. 3, Sheet 2, is a view of the carrier-wheel ratchet-arms. Fig. 4, Sheet 2, is a detail view of one of the shovel-beams; Fig. 5, Sheet 2, detail views of the adjustable palm for the support of the scraper-beam; Fig. 6, Sheet 2, a detail view of the adjusting-arm fulcrum-clip; Fig. 7, Sheet 2, detail of one of the scraper-beams.

A represents the center bar of the cultivator; A', head bent at right angles edgewise; $A^2$, bolt-holes for the clevis attachment; $A^3$, a side bend for lap of rear share-beam; B B, right and left outer bars of the cultivator; B', heads or fulcrums to same; C, combining-head; C', binding-ledges; $C^2$, fulcrum-pins; D D, front shovel-beams; D', fulcrum for same; $D^2$, quadrant-heads; $D^3$, adjustable bolt-holes; E, shovels for same; E', securing-bolts; F, rear side scraper-beams; F', a rounding of the beam for change of scraper to that of shovel; G, the scrapers; H, rear-end double-winged share-beam; H', quadrant-head; $H^2$, adjusting bolt-holes; N', fulcrum for the beam; $H^3$, double-winged share; I, cage for width-adjusting bars; I', loops to receive the same; $I^2$, set-screw for retaining width adjustment when made; J, width-adjusting bars; J', fulcrum or pivots to same; K, a cast-iron fulcrum-clip; K', recess for fulcrum-pivot; $K^2$, hole for retaining-bolt; L, a cast-iron palm for the seat of the scraper-beam; L', its fulcrum; $L^2$, a quadrant-head; $L^3$, a serrated slot in the quadrant-head; $L^4$, a securing-bolt; $L^5$, a segmental slot in the seat, and $L^6$ securing-bolts for beam; M, the handles; M', cross-bar; N, braces from center bar to handles; N', securing-bolt for brace-foot, and the fulcrum-bolt for the double-winged share-beam; $N^2$, securing-bolts at handles for braces; O, ratchet-faced washers lapping over the front end of the center bar; O', lap; $O^2$, ratchet-teeth; $O^3$, central hole; P, carrier-wheel arms; P', ratchet-face hubs to same; $P^2$, hub for wheel-shaft; $P^3$, securing-bolt; Q, carrier-wheel; Q', shaft to same.

The construction of my cultivator requires very little of first-class skilled labor, the center bar merely having one right-angle edge bend at the front and an offset side bend at the rear end, the outer bars having their forward ends bent around to form fulcrum-eyes for the cap-pins. The width-adjusting bars are plain. The drilling and fitting are of the simplest character, and therefore the complete machine may be sold cheaply at a good profit.

The combining-head connecting the outer and center bars is composed of two cast-iron plates, duplicates of each other, having on their inner faces ledges, within which the center bar is gripped, and pivots cast integral with the cap, which project into the bent eyes of the outer bars and form the pivots or fulcrums upon which they revolve or swing. The scraper-beam palms are also of cast-iron, and the segmental and bolt-securing holes in the beam-seat are so arranged relatively to each other and the beam that the scraper may be made to assume a position at right angles with the bar on plan, or to form an acute angle with the same to the right or left hand side thereof, being provided with a quadrant slotted head-fulcrumed at L', and the slot-edges serrated to suit a square-shanked bolt. The scraper may be adjusted with great nicety to scrape to any required depth or angle within the capacity of the cultivator, and the bolt being entered to coincide with the serrations of the slot, the beam is securely held in said position. The width-adjusting bars' fulcrum-bolt clips are also of cast-iron, and are so arranged that the bolt L', for securing it to the outer bar, is also the fulcrum-pivot for the scraper-beam palm. The adjusting-bars are pierced at one end for the fulcrum-bolts at such distance therefrom as will cause the bar to lap beneath the outer bar of the cultivator, the clips being held in place by the bolt L'. The fulcrum-bolt, which is provided with an enlarged flat rounded head, laps well onto the top of the bar and clip, and the latter, thus held between the width-bar and head, cannot get out of adjustment. The offset and lap of the rear beam and center bar bring the handles and braces central to the cultivator.

The rear side-bar scraper-beams are constructed to receive both the scraper and cultivator shovels. For the latter purpose the section of the beam at the point of attachment is rounded to correspond with the concavity of the shovels, (and thereby give them the proper pitch.) This feature is novel in cultivators, and I save thereby the expense of separate shovel-beams when such change is desired.

The handles are adjustable for height upon the braces, as is usual with the same upon cultivators, &c.

The carrying-wheel, with its ratched-faced arms or brackets, is adjustable to any desired height; by simply unscrewing the binding-bolt in the ratchet-head, drawing the heads out of gear with the ratchet-washers, then swinging the wheel brackets or arms around upon the binding-bolt to the desired point, again interlocking the ratchet-teeth, and screwing up the binding-nut, the wheel is firmly held in place at its selected height from the ground to give the proper degree of penetration to the shovels and scrapers when put to use.

Having shown the construction, operation, and advantages of my improvement, I desire to secure by Letters Patent the following claims:

1. In combination with a cultivator as described, and with the rear scraper and shovel beams of the same, the fulcrumed palms L, provided with a seat for the scraper or shovel beam, said seat having a segmental slot and a series of holes for the beam-bolts, a fulcrum, L', and at its opposite end a quadrant-head provided with a segmental slot, and a bolt coincident therewith, whereby the scrapers may be adjusted for depth and at any angle between right and acute, as and for the purpose set forth.

2. In combination with a cultivator as described, and with the width-adjusting bars thereof, the fulcrum-bolt clips K, having an open notch, K', to receive the fulcrum-bolt J', and a securing-bolt, L', by which it is combined with the outer bar, B, and the palm L, the securing-bolt L' being the fulcrum for the latter, substantially as and for the purpose set forth.

AUGUSTUS G. CHRISTMAN.

Witnesses:
 THOMAS P. KINSEY,
 F. PIERCE HUMMEL.